(12) United States Patent
Furuhashi et al.

(10) Patent No.: US 7,710,438 B2
(45) Date of Patent: May 4, 2010

(54) IMAGE PROCESSING APPARATUS AND IMAGE PROCESSING METHOD

(75) Inventors: Ryusuke Furuhashi, Kanagawa (JP); Masanori Takamatsu, Kanagawa (JP); Hiroshi Dohi, Tokyo (JP); Hideki Matsuzaka, Kanagawa (JP); Hiroyuki Ushifusa, Tokyo (JP); Hideyuki Shoji, Kanagawa (JP); Tsukasa Ishii, Tokyo (JP); Minoru Sato, Tokyo (JP); Chieko Aizawa, Tokyo (JP)

(73) Assignees: Sony Corporation, Tokyo (JP); Olympus Medical Systems Corp., Tokyo (JP)

( * ) Notice: Subject to any disclaimer, the term of this patent is extended or adjusted under 35 U.S.C. 154(b) by 616 days.

(21) Appl. No.: 11/566,906

(22) Filed: Dec. 5, 2006

(65) Prior Publication Data

US 2008/0174609 A1 Jul. 24, 2008

(30) Foreign Application Priority Data

Dec. 6, 2005 (JP) ............................ P2005-352484

(51) Int. Cl.
*G09G 5/00* (2006.01)
*G09G 5/36* (2006.01)
*A61B 1/04* (2006.01)
*H04N 5/76* (2006.01)
*H04N 5/45* (2006.01)
*H04N 1/393* (2006.01)
*H04N 1/46* (2006.01)

(52) U.S. Cl. ..................... 345/619; 345/660; 345/665; 345/671; 345/548; 348/45; 348/231.3; 348/563; 348/564; 358/537; 358/448; 358/451

(58) Field of Classification Search ................. 345/619, 345/630, 660, 665, 671, 548, 547, 555; 348/14.07, 348/45, 231.3, 42, 561, 563, 564, 567; 358/537, 358/538, 448, 452, 451
See application file for complete search history.

(56) References Cited

U.S. PATENT DOCUMENTS

2002/0030634 A1 * 3/2002 Noda et al. .................... 345/5

(Continued)

FOREIGN PATENT DOCUMENTS

JP 07-131745 5/1995

(Continued)

*Primary Examiner*—Wesner Sajous
(74) *Attorney, Agent, or Firm*—Sonnenschein Nath & Rosenthal LLP

(57) ABSTRACT

A plurality of images with additional information are designed to be displayed on one screen or a recording paper efficiently so as to enhance ease of visual confirmation and facilitate recording paper handling. Image data including a captured image section and an additional information section is inputted from an endoscope device, and this image data is saved in an image memory. There is generated synthetic image data displaying respectively each of the plurality of the image data saved in the image memory on a plurality of designated regions A to D allocated within one screen. At this instant, the image data including the captured image section and the additional information section is arranged to be displayed on a first designated region within one screen, while the captured image section of the image data to be displayed on the first designated region is enlarged and displayed on a second designated region.

24 Claims, 15 Drawing Sheets

U.S. PATENT DOCUMENTS

| | | | |
|---|---|---|---|
| 2002/0048413 A1* | 4/2002 | Kusunoki | 382/282 |
| 2003/0060678 A1* | 3/2003 | Watai et al. | 600/109 |
| 2005/0253868 A1* | 11/2005 | Ageishi et al. | 345/629 |
| 2006/0078157 A1* | 4/2006 | Bruekers et al. | 382/100 |
| 2006/0106284 A1* | 5/2006 | Shouji et al. | 600/118 |

FOREIGN PATENT DOCUMENTS

| | | |
|---|---|---|
| JP | 09-258709 | 10/1997 |
| JP | 2003-178318 | 6/2003 |

* cited by examiner

… … …

IMAGE PROCESSING APPARATUS AND IMAGE PROCESSING METHOD

CROSS REFERENCES TO RELATED APPLICATIONS

The present invention contains subject matter related to Japanese Patent Application JP 2005-352484 filed in the Japanese Patent Office on Dec. 6, 2005, the entire contents of which being incorporated herein by reference.

BACKGROUND OF THE INVENTION

1. Field of the Invention

The present invention relates to an image processing apparatus and an image processing method for generating synthetic image data to enable a plurality of images to be displayed on a screen or printed on a recording paper.

2. Description of the Related Art

Information processing apparatuses such as personal computers, peripherals of personal computers, digital cameras, and communication terminals made it possible to operate devices as well as see images and characters by being equipped with display means such as monitor screens. While these information apparatuses become smaller in size, they are being provided with advanced functions and multiple functions. In accordance with this trend, display means set up on the information processing apparatuses is capable of displaying many images and characters arranged side by side for each item. On the other hand, displayed contents are complicated, thereby reducing visibility and operability.

In the past, to display more information on a display screen divided into a plurality of regions, images and characters are displayed side by side for each item. To improve visibility, a region selected by a user is displayed in enlargement. This enables the user to grasp an entire structure of the display and confirm the contents of a desired image and a character in detail.

Note that for Patent Documents in this area, there are Jpn. Pat. Appln. Laid-Open Publication No. 9-258709 (Patent Document 1) and Jpn. Pat. Appln. Laid-Open Publication No. 2003-178318 (Patent Document 2).

However, techniques in the above-mentioned Documents is to display in enlargement only a desired region inside a divided screen, thus causing inconvenience mainly in medical and industrial fields. For example, in the medical field, image data outputted from video apparatuses such as an ultrasonic image-pickup device, MRI, electronic microscope, and endoscope is so constituted that together with an image of a subject, additional information associated with the image data is displayed. Consequently, in displaying a plurality of images, a picked-up image is arranged with the additional information on each divided region of each screen and displayed together to be printable as well. For example, on each divided screen, patient's information and identification information of the endoscope are displayed in proximity to the image of the subject as the additional information of that image. Further, the patient's information is, for example, directly inputted by the user from a operating section, while the identification information is also directly inputted from the endoscope device. In such example, of the images collectively shown, what the user selected and displayed in enlargement, for instance, to enable details of the patient's image to be seen.

SUMMARY OF THE INVENTION

However, when a single image is displayed in enlargement, it is not easy to compare it with other images. Even if corrective action is taken by printing, as the number of copies increases, it is inefficient due to worse handling. Consequently, there is a method of improving such matters (see Patent Document 3: Jpn. Pat. Appln. Laid-Open Publication No. 7-131745) by displaying (e.g., divided into two) the plurality of images on the same screen or on printing paper. However, the additional information is arranged for each image, occupying a large area. Therefore, the image in question is not substantially enlarged.

The present invention has been made in order to solve the above-mentioned matters. It is desirable to provide an image processing apparatus and an image processing method which can improve visibility and facilitate handling the recording paper enabling a plurality of images on one screen or a recording paper to be displayed efficiently together with additional information.

According to an embodiment of the present invention, there is provided an image processing apparatus for generating synthetic image data based on an inputted image data from an external device, the apparatus including: input means for inputting image data including an image section and an additional information section associated therewith from the external device; an image memory that saves the image data inputted to the input means, image processing means for generating synthetic image data to display respectively a plurality of image data saved in the image memory on a plurality of designated regions allocated to inside one screen; and output means for outputting the synthetic image data. Further, the image processing means is so arranged that the image data including the image section and the additional information section is displayed on a first designated region within the one screen, generating synthetic image data so that an image section which enlarged an image section of the image data to be displayed on the first designated region is displayed on a second designated region inside the one screen.

According to an embodiment of the present invention, there is also provided an image processing method for generating synthetic image data based on inputted image data from an external device, which method uses the image processing apparatus as described above, wherein the image data including the image section and the additional information section is displayed on a first designated region within the one screen, and synthetic image data is generated so that an image section which enlarged an image section of the image data to be displayed on the first designated region is displayed on a second designated region inside the one screen.

According to the present invention, since the image processing means makes the image data including the image section and the additional information section to be displayed on the first designated region within one screen and the image section which is an enlargement of the image section of the image data displayed on the first designated region to be displayed on the second designated region within one screen, the plurality of images can be efficiently displayed together with the additional information on one screen or the recording paper, thereby improving visibility and facilitating handling of the recording paper.

DETAILED DESCRIPTION OF THE PREFERRED EMBODIMENTS

Figure 1:
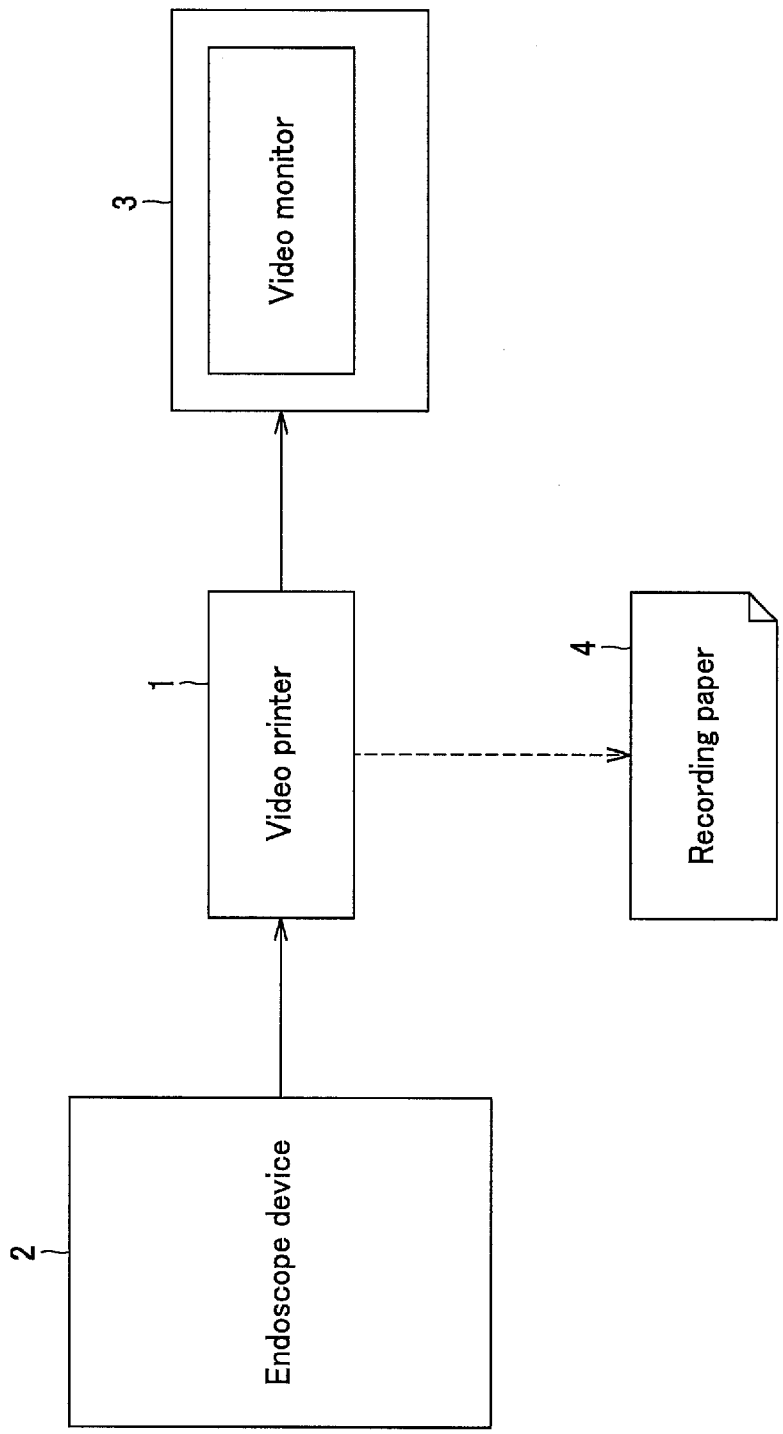
FIG. 1 is a diagram explaining a usage example of a video printer according to an embodiment of the present invention.

Referring to the drawings, a video printer applied to an image processing apparatus according to an embodiment of the present invention will be described.

As shown in FIG. 1, a vide printer 1 according to the embodiment of the present invention is what is used in medical scenes with an input side to which an endoscope device 2, that is, a video apparatus as an external device, is connected, and further an output side to which a video monitor 3 is connected. Furthermore, the video printer 1 displays captured image data inputted from the endoscope device 2 on the video monitor 3 made up of a CRT (Cathode Ray Tube) or an LCD (Liquid Crystal Display). At the same time, such data is printed on a recording paper 4. Note that this video monitor 3 may be an integrated type built in the vide printer 1, or may be hooked up externally to the video printer 1.

At this point, the endoscope device 2 has a rigid endoscope or a flexible endoscope. When one point in time of images picked up is captured, one frame or one field section of the captured image data is generated. Further, the endoscope device 2 stores in its memory status data regarding specifications of the endoscope such as serial number and length thereof. Furthermore, patient identification data such as the patient's ID number, name, sex, age, and remarks of patient's name are inputted by the user into the endoscope device 2, and the patient identification data is stored in the memory.

Figure 2:
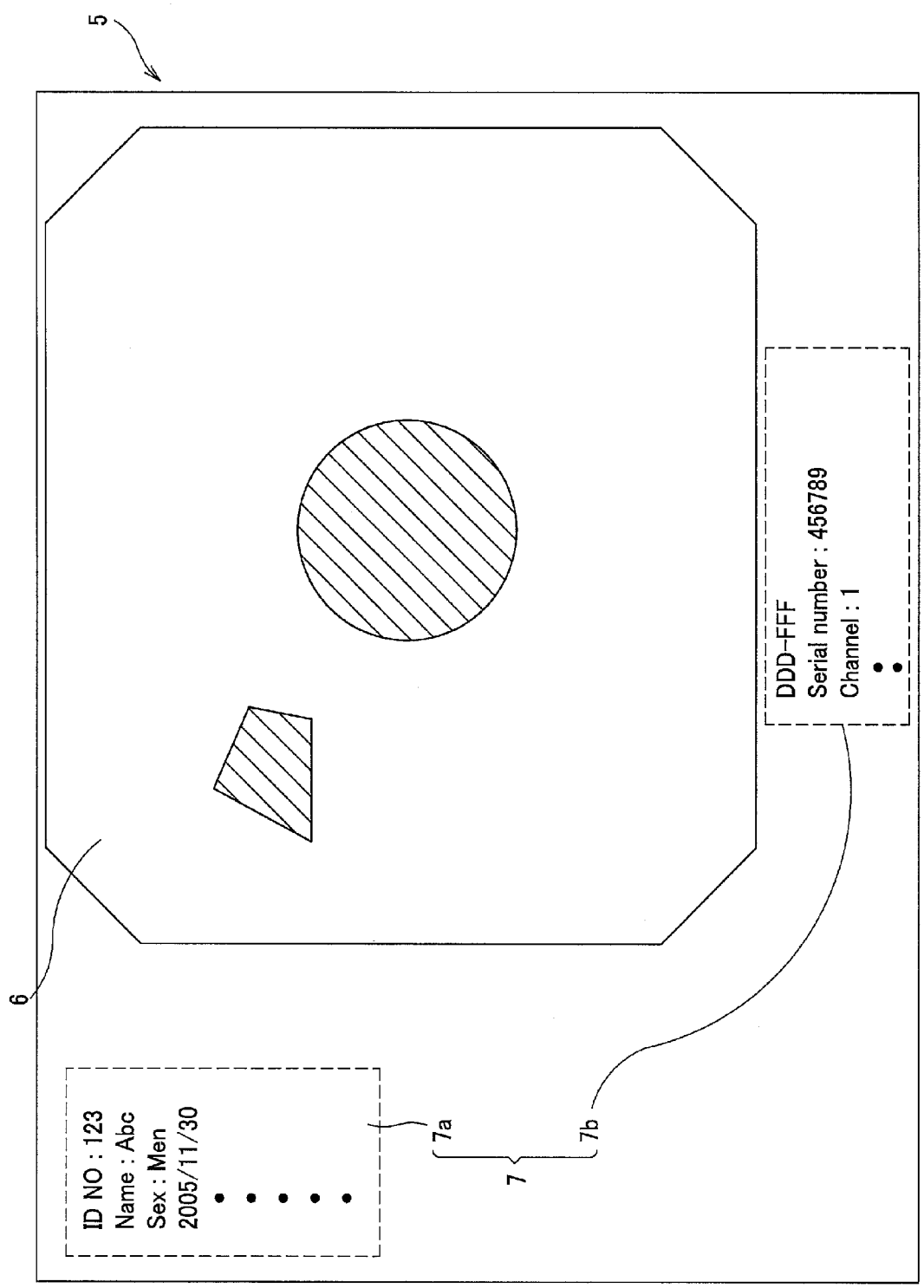
FIG. 2 is a diagram showing captured image data inputted from an endoscope device.

When outputting to the video printer 1, the endoscope device 2 generates, as shown in FIG. 2, image data 5 composed of a captured image section 6 including of the captured image data, and an additional information section 7 provided with a patient identification section 7a including of patient identification data and a status identification section 7b including of status data of the endoscope. This image data 5 is outputted to the video printer 1.

Specifically, the video printer 1 according to the embodiment of the present invention includes an input terminal 11 to which the image data 5 is inputted from the endoscope device 2, an image memory 12 saving the image data 5 inputted from the input terminal 11, an image processing section 13 subjected to image processing such as trimming to the image data 5 saved in this memory 12, and an output terminal 14 outputting synthetic image data subjected to image processing at the image processing section 13. Further, the video printer 1 includes a print head 15 connected to the output terminal 14, and a print signal conversion section 16 generating print data to be printed by the print head 15. Still further, the video monitor 3 is connected to the output terminal 14. The video printer 1 is configured to print the synthetic image data, which was subjected to image processing, and/or display on the video monitor 3 as a result of connecting the print head 15, the print signal conversion section 16 and the video monitor 3 to the output terminal 14. Furthermore, the video printer 1 having a selection button for selecting the image data 5 is constituted by an operation section 17 generating operating signals corresponding to various operating buttons and a control section 18 controlling the whole according to an input from the operating section 17. Note that the operating section 17 may be composed of pushbuttons. In addition, it may be a touch panel.

The image memory 12 saves the image data 5 inputted from the input terminal 11 in order of time or operation.

Figure 4:
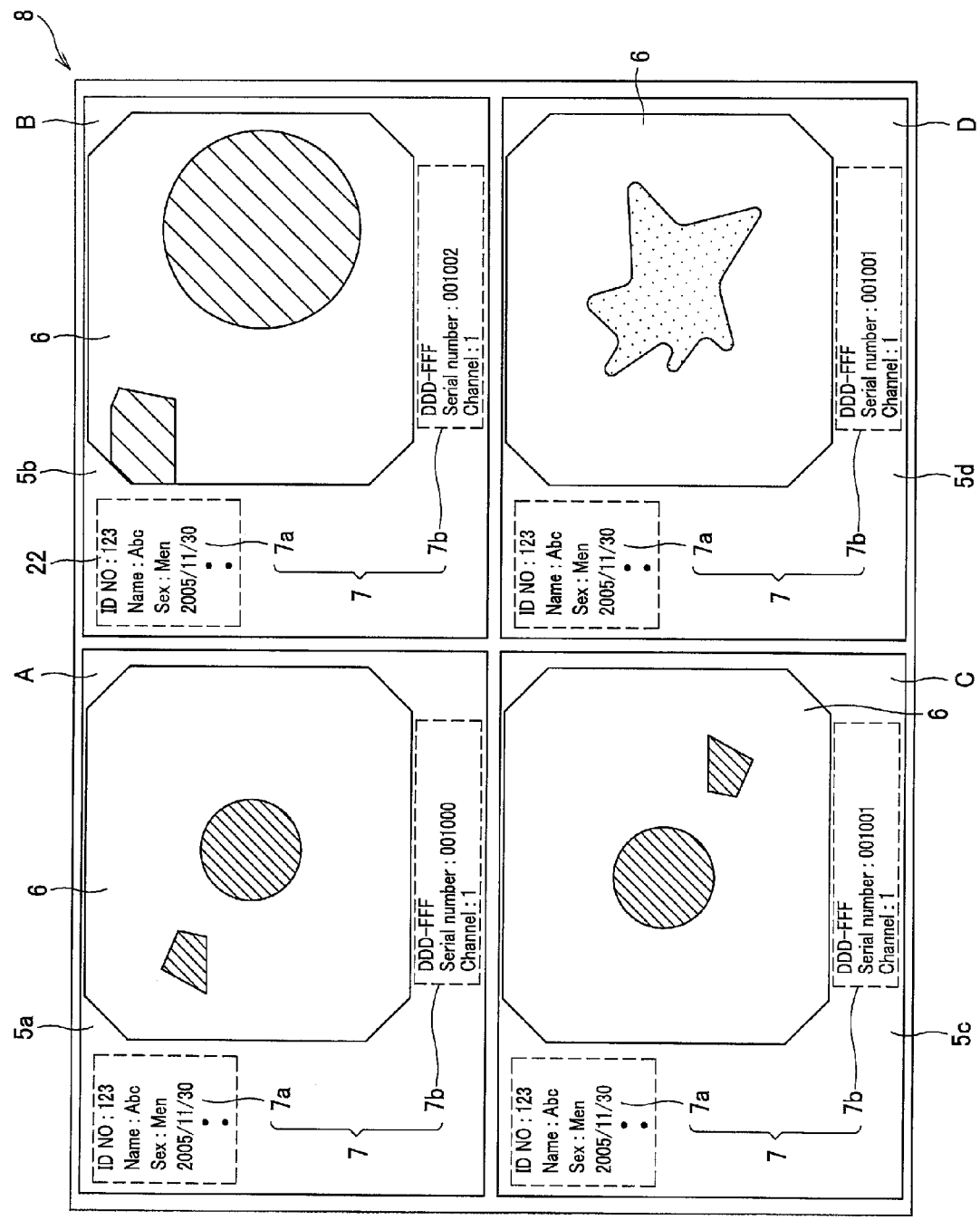
FIG. 4 is a diagram showing synthetic image data before selection processing.

The image processing section 13 generates synthetic image data 8 capable of displaying four pieces of the image data 5 on a display screen of the video monitor 3 or the recording paper 4. Specifically, this synthetic image data 8, for example, as shown in FIG. 4, can display four pieces of the image data 5 on one screen or one recording paper 4. They are divided into four regions A, B, C, and D. To each region A to D, the image data 5a, 5b, 5c, and 5d are allocated in order of control by the image memory 12. The image data 5a to 5d allocated to each region are provided with a captured image section 6 and the additional information section 7.

Further, when one or a plurality of the regions A to B of the synthetic image data 8 are selected by the operating section 17, that selecting signal is inputted from the control section 18. Then the image processing section 13 performs trimming processing to remove the additional information section 7 from the image data 5 allocated to a selected region. At the same time, it performs enlargement processing to enlarge the captured image section 6 on the regions A to D and generates the synthetic image data 9 according to the embodiment of the present invention. Specifically, in FIG. 5, the synthetic image data 9 according to the embodiment of the present invention where the regions B to D of the regions A, B, D, and D divided into four is shown. Namely, the region A is a not-selected region to become a first region not selected by the user, and the image data 5 including the captured image section 6 and the additional information section 7 shown in FIG. 2 is displayed. The regions B to D are a selected region to become a second region selected by the user. The additional information section 7 is subjected to trimming, while the captured image section 6 is displayed in enlargement. This enables the user to obtain information on the patient and the endoscope through the additional information section 7 of the region A on one screen or one sheet of the recording paper 4. Further, in addition to the captured image section 6 of the region A, the user can confirm visually details of an affected section through the captured image section 6 of the enlarged regions B to D.

Figure 5:
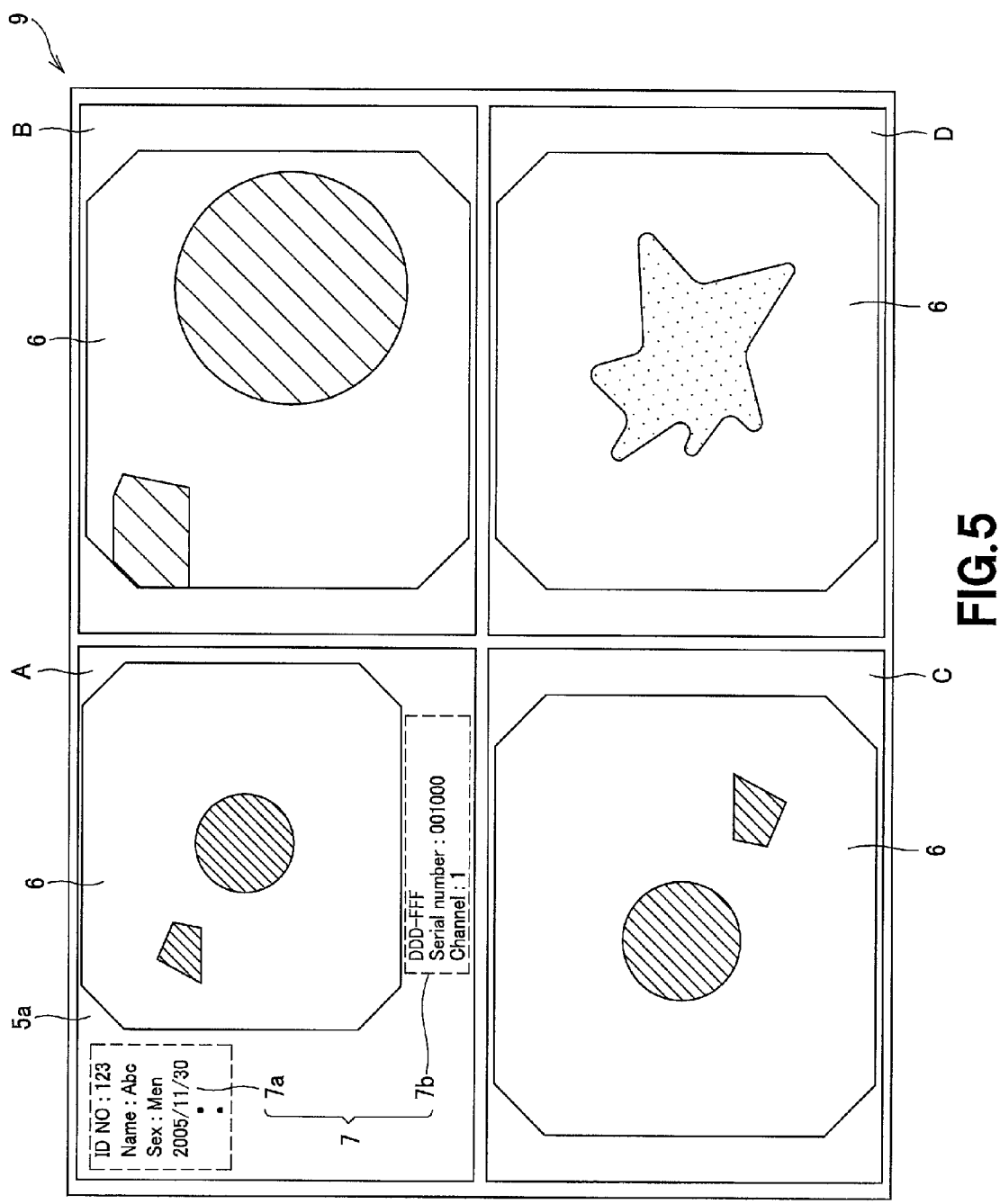
FIG. 5 is a diagram showing synthetic image date after selection processing.

The image processing section 13, by outputting the synthetic image data 8 shown in FIG. 4 and the synthetic image data 9 shown in FIG. 5 to the output terminal 14, enables these synthetic image data 8 and 9 to be printed on the recording paper 4 or to be displayed on the video monitor 3.

Note that in the examples of FIG. 4 and FIG. 5, a case of dividing the region into four sections was described. However, in the present invention, the number of divisions is not limited to this. For example, 2 divisions, 6 divisions, and 8 divisions are acceptable. Further, in FIG. 5, a not-selected region which is the first region may be a region other than the region A.

Further, in enlarging the captured image section 6 of the selected area which is the second region, as mentioned above, in addition to deleting the additional information section 7, such processing as reducing the additional information section 7 by means of the image processing section 13, or further omitting a part of the additional information section 7, for example, omitting the status identification section 7b, may be conducted to broaden the enlarged display region of the captured image section 6.

A thermal head is used for a print head 15 printing the synthetic image data 8 and 9 of FIG. 4 and FIG. 5 to realize high grade print quality. The recording paper 4 as a print object is a recording paper made of a base material sheet such as a resin on which a recording layer is provided. By impressing thermal energy corresponding to image data to be printed by the thermal head upon the recording layer, a desired image is transcribed.

Note that when using the thermal head for the print head 15, color materials such as ink ribbon dyes may be subjected to thermal transcription to an ordinary paper to form an image. Further, as the print head 15, in addition to the thermal head, there may be used a print head for inkjet which ejects an ink from a nozzle by generating pressure in a liquid chamber.

The print signal conversion section 16 generates print data for driving the print head 15 based on the synthetic image data 8 and 9 of FIG. 4 and FIG. 5 inputted from the image processing section 13, and controls driving the print head 15 based on this print data.

Figure 6:
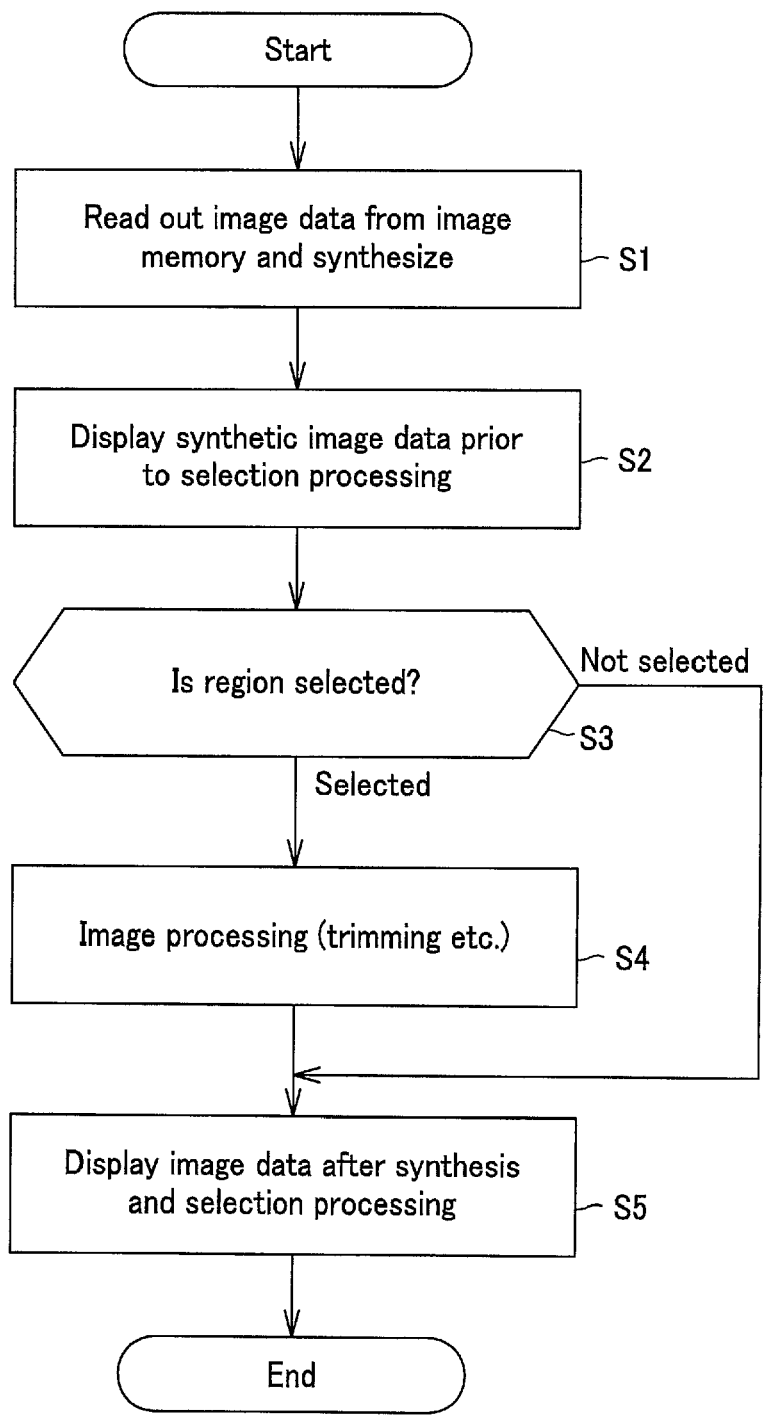
FIG. 6 is a flowchart showing operation according to a first embodiment.

Next, in the video printer 1 configured as described above, referring to FIG. 6, a series of procedures from the synthetic image data 8 shown in FIG. 4 to generation of the synthetic image data 9 shown in FIG. 5.

First, when the image data 5 captured by the endoscope device 2 as shown in FIG. 2 is inputted to the input terminal 11, the video printer 1 saves the image data 5 shown in FIG. 2 in the image memory 12 in order of read-out. Then the image processing section 13 reads out the image data 5 from the image memory 12 and allocates the image data 5a, 5b, 5c, and 5d to the four regions A to D in order of being controlled by the image memory 12. Then, the image processing section 13 generates the synthetic image data 8 shown in FIG. 4. Next, the image processing section 13 outputs the synthetic image data 8 to the output terminal 14 in step S2, and displays this synthetic image data 8 on the display screen of the video monitor 3.

In step S3, the image processing section 13 determines which of the regions A to B of the synthetic image data 8 was selected from the operating section 17 based on a selection signal from the control section 18. Then, the image processing section 13 proceeds to step S4 regarding the selected region and further to step S5 regarding the not-selected region.

With regard to the selected region, in step S4, the image processing section 13 performs trimming processing to remove the additional information section 7 from the image data 5 allocated to the selected region. At the same time, the image processing section 13 performs enlargement processing to enlarge the captured image section 6 on the regions A to D.

Then, the image processing section 13, in step S5, synthesizes the image data of the selected region subjected to trimming and the image data of the not-selected region and generates the synthetic image data 9 shown in FIG. 5. Namely, only the captured image section 6 is synthesized on the region subjected to selection processing. Further, the image processing section 13 synthesizes, in the not-selected region the image data 5 including the captured image section 6 and the additional information section 7 which have not been subjected to any image processing with respect to the image data 5. Moreover, the image processing section 13 outputs the thus-generated synthetic image data 9 shown in FIG. 5 from the output terminal 14 and displays it on the video monitor 3. This enables the user to obtain information on the patient and the endoscope through the additional information section 7 of the region A on one screen. Further, the user can confirm visually details of the affected section through the captured image section 6 of the enlarged regions B to D in addition to the captured image section 6 of the region A.

Further, when print execution operation is performed, the image processing section 13 outputs the synthetic image data 9 shown in FIG. 5 from the output terminal 14 to the print signal conversion section 16 to be converted to print data in the print signal conversion section 16. By driving the print head 15, the synthetic image data 9 displayed on the video monitor 3 is printed on the recording paper 4. In this manner, the user can obtain through the recording paper 4 information on the patient and the endoscope at the additional information section 7 of the region A. Further, in addition to the captured image section 6 of the region A, the user can confirm visually the details of the affected section through the captured image section 6 of the enlarged regions B to D.

Namely, in the synthetic image data 9, of the images displayed on each regions A to D on the screen, the captured image section 6 desired by the user is displayed in enlargement. At the same time, by reducing a duplicate display of the additional information section 7 accompanying a collective display of a plurality of images, visibility can be improved. Further, when printing on the recording paper 4, the print is easy to see, and a print space can be used efficiently. Moreover, an enlarged display can be made in a condition of maintaining a visual image without changing a display layout in comparison to the synthetic image data 8 prior to selection. Hence, operation to switch one screen to another is no longer necessary, thus contributing to improving visibility.

Next, a second embodiment of the present invention will be described. This example, the captured image section 6 is automatically displayed in enlargement on the synthetic image data 9 shown in FIG. 5, for example, on the regions B to D excepting the region A on the top left. Note that an example of the 4 divisions is taken up for description.

Figure 7:
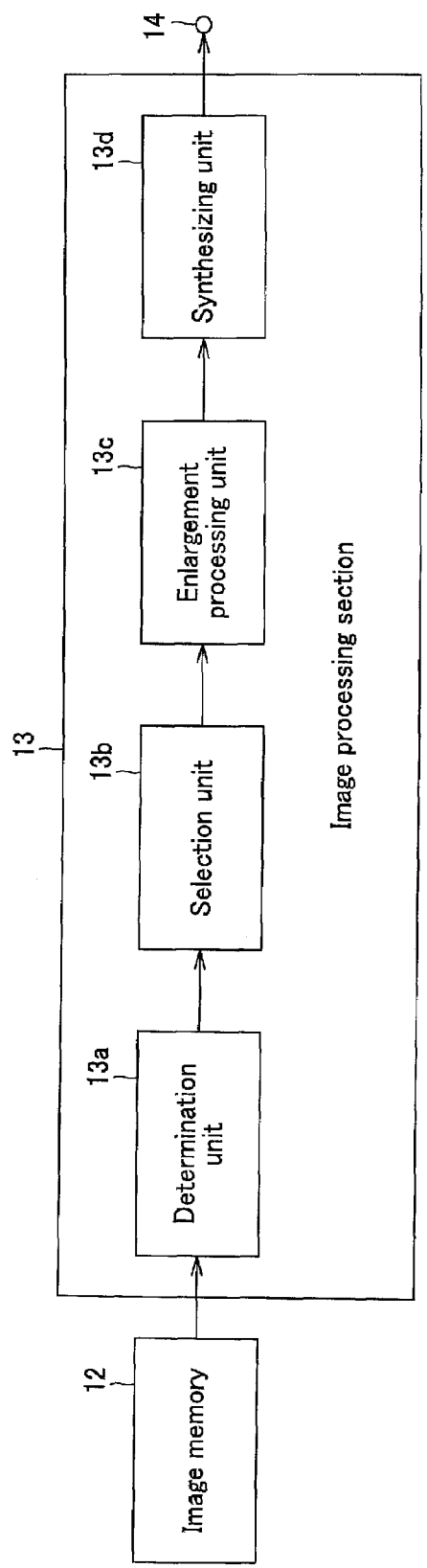
FIG. 7 is a block diagram showing a configuration of an image processing section according to a second embodiment.

In this example, the image processing section 13, as shown in FIG. 7, includes a determination section 13a determining the image data 5 allocated respectively to the regions A to D, a selection section 13b selecting the image data 5 enlarging the captured image section 6, an enlargement processing section 13c performing trimming and enlargement processing of the image data 5 selected in the selection section 13b, and a synthesis section 13d synthesizing the image data 5 subjected to enlargement processing and the image data 5 as it is.

Figure 10:
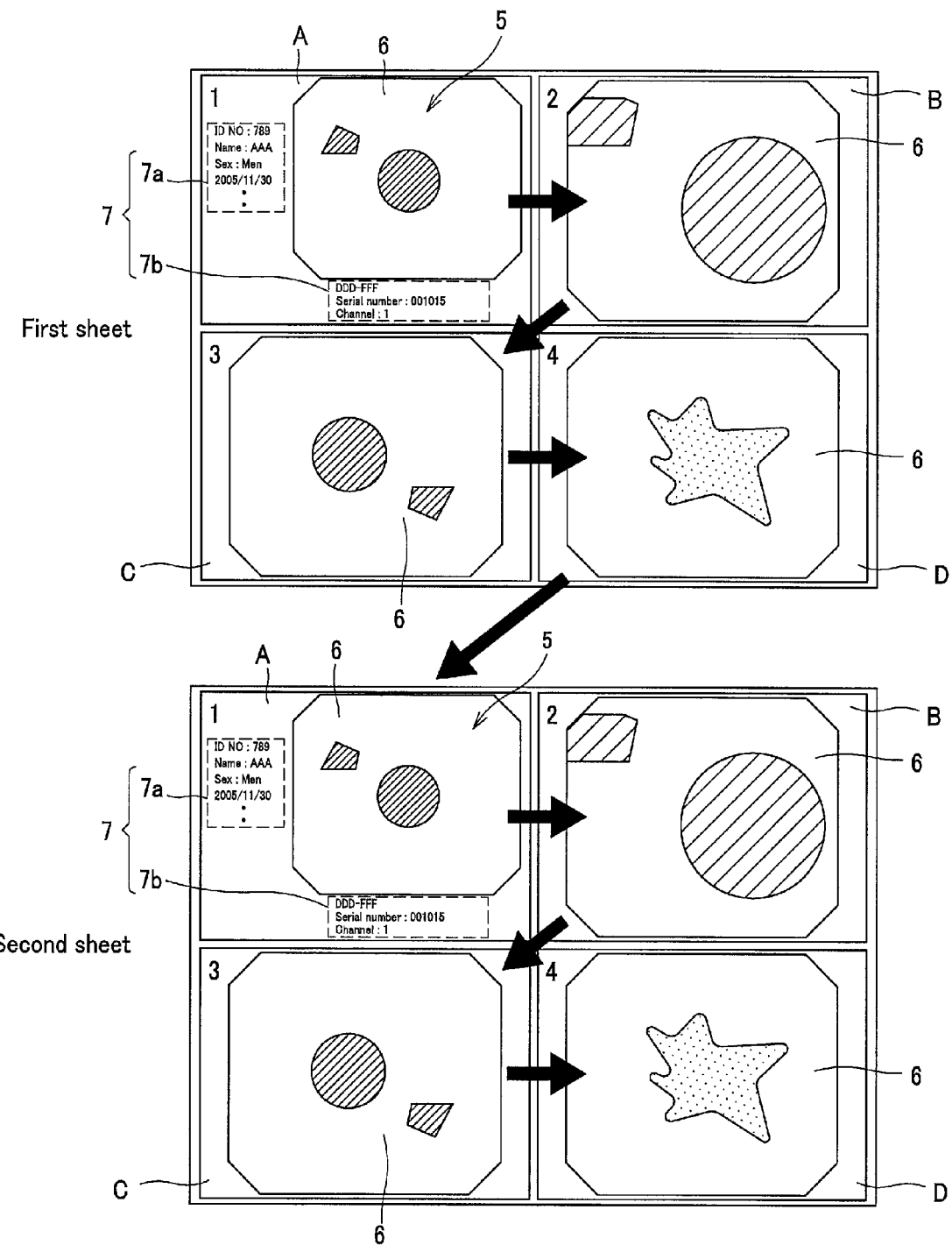
FIG. 10 is a diagram showing synthetic image data according to the second embodiment.

The determination section 13a provides an ID No. to the image data 5 controlled in order by the image memory 12. For example, as shown in FIG. 10, since the determination section 13a displays 4 images on one screen, a first image is numbered "1", a second image is numbered "2", a third image is numbered "3", and a fourth image is numbered "4". A fifth image on the next screen is numbered "1", a sixth image is numbered "2".... Numbering processing is performed in one screen. Note that the number of division on one screen is set as 4. However, as mentioned above, the number of division is not limited to this.

Further, the determination section 13a has a definition to correspond numbers "1" to "4" of the image data 5 to the regions A to D. Furthermore, a pre-determined region is defined as a region which enlarges the captured image section 6. For example, the determination section 13a assigns the image data 5 of "1" to the region A, assigns the image data 5 of "2" to the region B, assigns the image data 5 of "3" to the region C, and assigns the image data 5 of "4" to the region D.

The selection section 13b selects the image data 5 to be displayed in enlargement. Namely, the selection section 13b selects the image data 5 of "2", "3", and "4" numbered by the determination section 13a to display the captured image section 6 in enlargement. The image data 5 of "1" is not selected.

Note that, there is described herein a case where the image data 5 of "1" assigned to the region A is not selected, while the image data 5 of "2", "3", and "4" assigned to the regions B to D is selected. In the present invention, a region where the image data 5 is not selected may be one of the others. Moreover, the region may be a plurality of regions.

The enlargement processing section 13c, with regard to the image data 5 of "2" to "4" selected by the selection section 13b, performs trimming of the additional information section 7 as mentioned above and performs enlargement processing to enlarge the captured image section 6. Note that the enlargement processing section 13c may reduce the additional information section 7 or trim section thereof in addition to trimming the entire additional information section 7.

The synthesis section 13d synthesizes on the regions B to D the image data subjected to enlargement processing by the enlargement processing section 13c and numbered "2" to "4", synthesizes the image data numbered "1" not subjected to enlargement processing on the region A, and generates the synthetic image data 9 shown in FIG. 5.

Figure 8:
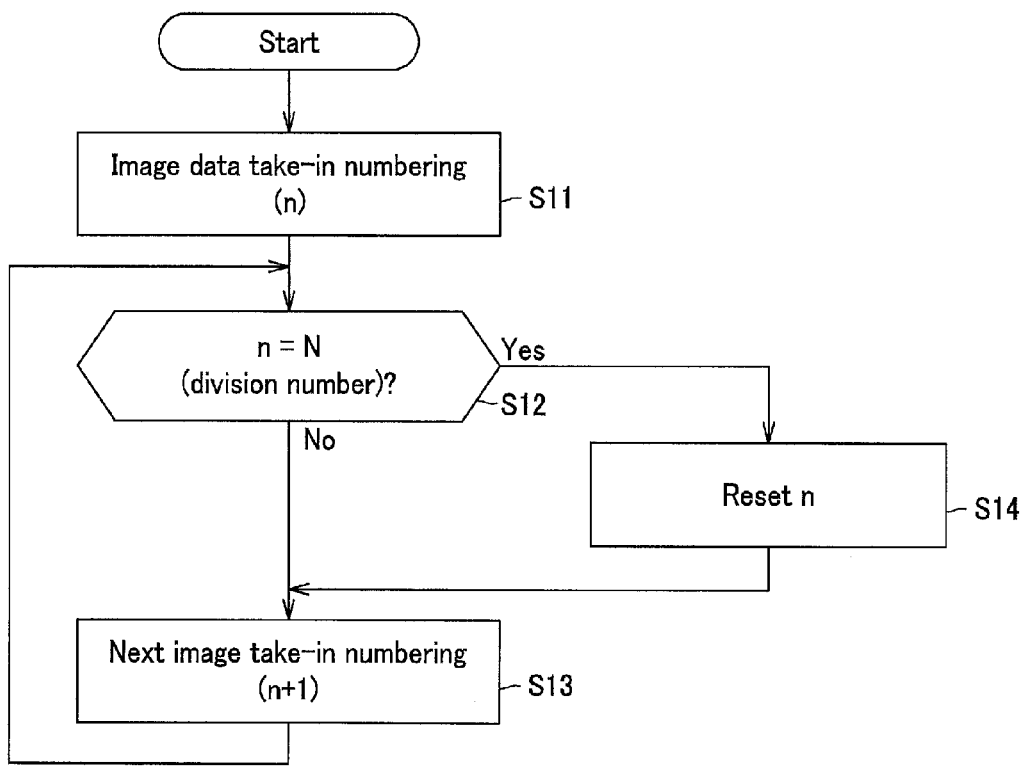
FIG. 8 is a flowchart showing operation according to the second embodiment.

Next, referring to FIG. 8 to FIG. 10, operation of the image processing section 13 configured as mentioned above will be described. In step S11, the determination section 13a takes in the image data 5 from the image memory 12 and number the taken-in image data 5 "n". For example, the determination section 13a takes in the image data 5 and numbers the taken-in image data 5 "1". In step S12, the determination section 13a determines whether the "n" of the numbered image data 5 is the division number N of one screen or not. Because four image data 5 are taken into one screen at this point, N=4. The determination section 13a determines if "n" is 4. Then, if n is not equal to N, in step S13, the determination section 13a takes in the next image data 5 from the image memory 12 and numbers it (n+1). For example, when the previously taken-in image data 5 is "1", the determination section 13a numbers the newly taken-in image data 5 from the image memory 12 "2", and returns to step S12. Further, in step S13, if n=N, the determination section 13a, in step S14, resets "n" so that numbering for the next screen can start from "1", and moves to step S13. Moreover, the determination section 13a assigns the image data 5 of "1" to the region A and assigns the image data 5 numbered with "2" to "4" to the regions B to D.

Figure 9:
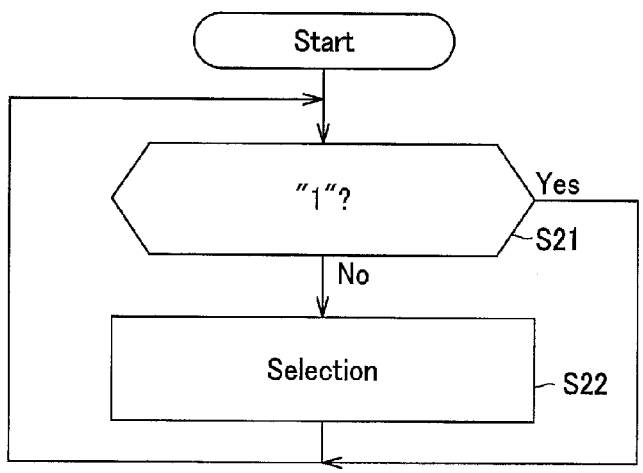
FIG. 9 is a flowchart continued from FIG. 8.

As shown in FIG. 9, the selection section 13b, in step S21, determines whether "1" assigned to the region A is the image data 5 numbered "1" or not. If not "1", that is, the image data 5 of "2" to "4" assigned to the regions B to D is represented, in step S22, selection processing is performed to display in enlargement the image data 5 numbered with the image data 5 of "2" to "4".

Then, the selection section 13b outputs the selected image data 5 of "2" to "4" to the enlargement processing section 13c.

The enlargement processing section 13c, as mentioned above, subjects the additional information section 7 to trimming and the captured image section 6 to enlargement processing for enlargement. Data subjected to enlargement processing is outputted to the synthesis section 13d. Then, in the synthesis section 13d, the image data numbered "2" to "4" subjected to enlargement processing in the enlargement processing section 13c are synthesized on the regions B to D. The image data 5 of "1" not subjected to enlargement processing is synthesized on the region A without trimming or enlargement processing. The synthetic image data 9 shown in FIG. 5 is thus generated. Then, by outputting the generated image data 9 shown in FIG. 5 through the output terminal 14, the synthesis section 13d displays the image data 9 on the video monitor 3 or outputs the image data 9 to the print signal conversion section 16 to be printed.

FIG. 10 herein shows the synthetic image data 9 generated in this example. As shown in FIG. 10, regardless of being the first sheet or the second sheet, only the region A at top left in the drawing is not selected and the image data 5 including the captured image section 6 to which "1" is provided and the additional information section 7 are displayed. The captured image section 6 of the image data 5 of "2" to "4" subjected to selection processing on the regions B to D is displayed in enlargement.

According to the examples mentioned above, since automatically the additional information section 7 is displayed together with the captured image section 6 on the first region of each screen or the recording paper 4, that is, the region A, operation to select a region where the user displays in enlargement can be omitted, thus contributing to enhancing convenience. Further, by displaying the captured image section 6 of one patient on one recording paper 4, for example, through assignment of four sheets of the image data 5 for one patient in this case, printed matter can be easily controlled.

Figure 3:
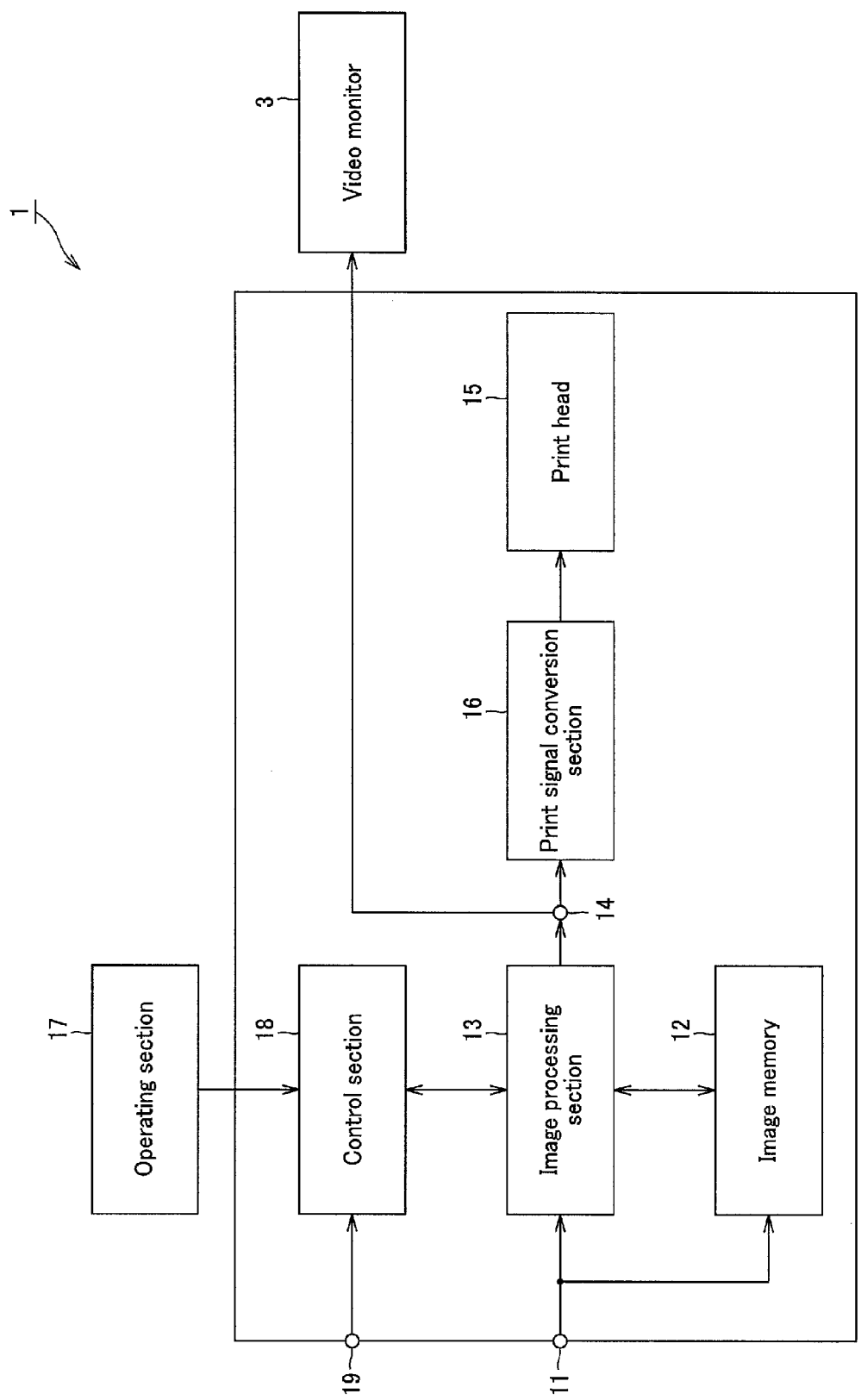
FIG. 3 is a block diagram of a video printer according to an embodiment of the present invention.
Figure 11:
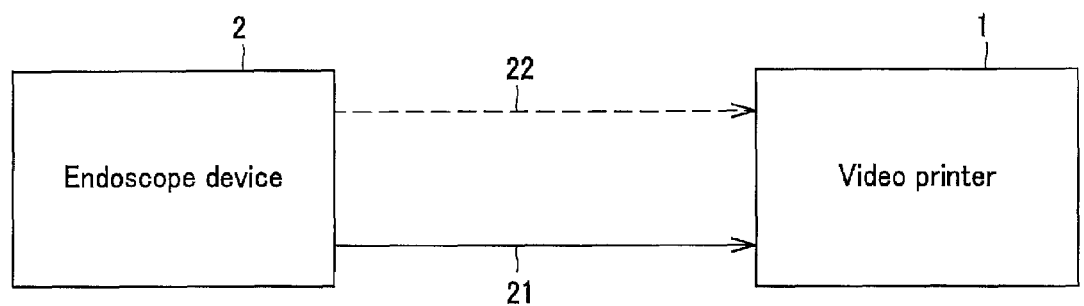
FIG. 11 is a diagram showing a configuration according to a third embodiment.

Still further, a third embodiment of the present invention will be described. The video printer 1 in this example is a variation of the first embodiment. As shown in FIG. 11, the video printer 1 is connected to the endoscope device 2, a video signal line 21, and a control signal line 22. The video signal line 21 is connected to the input terminal 11 of the video printer 1 to input video data outputted from the endoscope device 2 for displaying on the video monitor 3 as well as the image data 5 shown in FIG. 2. The video signal line 21 is what is also installed in the video printer 1 in the above-mentioned two examples. In this example, furthermore, the patient identification data including the additional information section 7 inputted from the control signal line 22 to the endoscope device 2 is inputted not as section of the image data but as category data. This video printer 1 converts this category data into visible identification data and synthesizes the data with the image data 5. The control signal line 22 is connected to an input terminal 19 shown in FIG. 3 to be inputted to the control section 18. Moreover, the region where the captured image section 6 is enlarged is not predetermined as in the second embodiment, but selected by user's operation.

Figure 12:
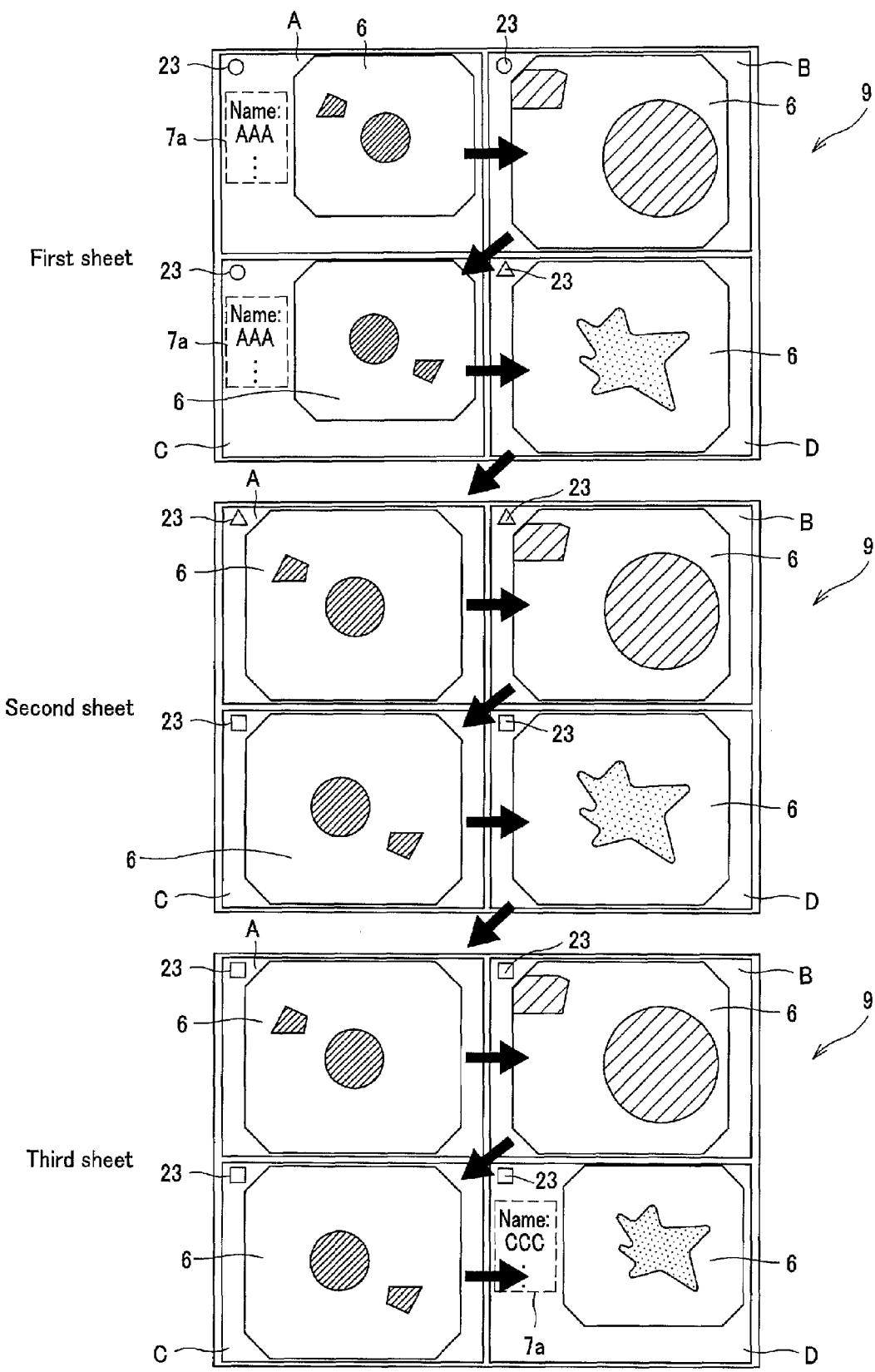
FIG. 12 is a diagram showing synthetic image data according to the third embodiment.

Specifically, as the category data for classifying various patients, from the endoscope device 2 through the input terminal 19 to the control section 18, there is inputted the patient identification data including the patient identification section 7a of the above-mentioned additional information section 7. The patient identification data is made to correspond to the image data 5 of FIG. 2, and is inputted to the control section 18 whenever the image data 5 of FIG. 2 is inputted. Moreover, the control section 18 determines the inputted category data as shown in FIG. 12, arranges it to correspond to the patient identification data, and generates the visible identification data 23. Namely, the control section 18 determines whether the category data is the same as the previously inputted category data or not. If same, the control section 18 selects the visible identification data 23 same as the previous visible identification data 23, and if not, selects the visible identification data 23 different from the previous visible identification data 23.

In the example of FIG. 12, as the visible identification data 23, "O" is assigned to the first patient AAA, "Δ" is assigned to the second patient BBB (not shown in FIG. 12), and "□" is assigned to the third patient CCC. Note that as the visible identification data, in addition to this, identification may be made by using colors such as red, blue and yellow.

Further, the control section 18 outputs the visible identification data 23 to the image processing section 13. The image processing section 13 assigns the image data 5a, 5b, 5c, and 5d to the regions A to D in order of control by the image memory 12. The image processing section 13 synthesizes the visible identification data 23 in the image data 5 assigned to the regions A to D. Still further, in the image processing section 13, the selection signal from the control section 18 is inputted when one or a plurality of numbers are selected inside the regions A to D of the synthetic image data 8 from the operating section 17. Trimming processing is performed to remove the additional information section 7 from the image data 5 assigned to the selected region(s). At the same time, enlargement processing is performed to enlarge the captured image section 6 inside the regions A to D and the image processing section 13 generates the synthetic image data 9 according to the embodiment of the present invention.

In the example of FIG. 12, the first sheet has the regions A and C as not selected and the regions B and D as selected. The regions B and D are the regions where the captured image section 6 is enlarged. On the regions A and C not selected, the image data 5 is as it is, that is, the patient identification section 7a of the captured image section 6 and the additional information 7 is provided. Further, the second sheet has all the regions A to D selected with the captured image section 6 enlarged. Moreover, the third sheet has the regions A to C selected with the captured image section 6 enlarged, while the region D is not selected with the patient identification section 7a of the captured image section 6 and the additional information 7 being provided.

Note that FIG. 12 is an example where the status identification section 7b regarding the endoscope device 2 of the additional information section 7 is omitted. In this case, the image processing section 13 performs image processing of trimming only the status identification section 7b with respect to all image data 5 inputted from the endoscope device 2.

In the example of FIG. 12, the regions A to C of the first sheet belong to patient AAA. As the visible identification data 23, "O" is shown. The user can verify from the patient identification section 7a of the patient AAA of the region A and the visible identification data 23 of "O" that the captured image section 6 of the regions A to C of the first sheet belongs to the patient AAA.

Further, the region D of the first sheet to the region B of the second sheet belong to patient BBB. As the visible identification data 23, "Δ" is shown. Note that the image data 5 of this patient BBB is all selected. The captured image section 6 is enlarged. The image data 5 including the not-selected captured image section 6 and the additional information section 7 is not shown, but the user can at least verify from the visible identification data 23 of "Δ" that the captured image section 6 of the patient other than the patient AAA and the patient CCC is shown.

Furthermore, the region C of the second sheet to the region D of the third sheet belong to patient CCC. As the visible identification data 23, "□" is shown. As for the patient CCC, the region D of the third sheet is not selected and the captured image section 6 and the additional information section 7 are shown. The user can verify from the patient identification section 7a of the patient CCC of the region D of the third sheet and the visible identification data 23 of "□" that the captured image section 6 of the region C of the second sheet to the region D of the third sheet belongs to the patient CCC.

Figure 13:
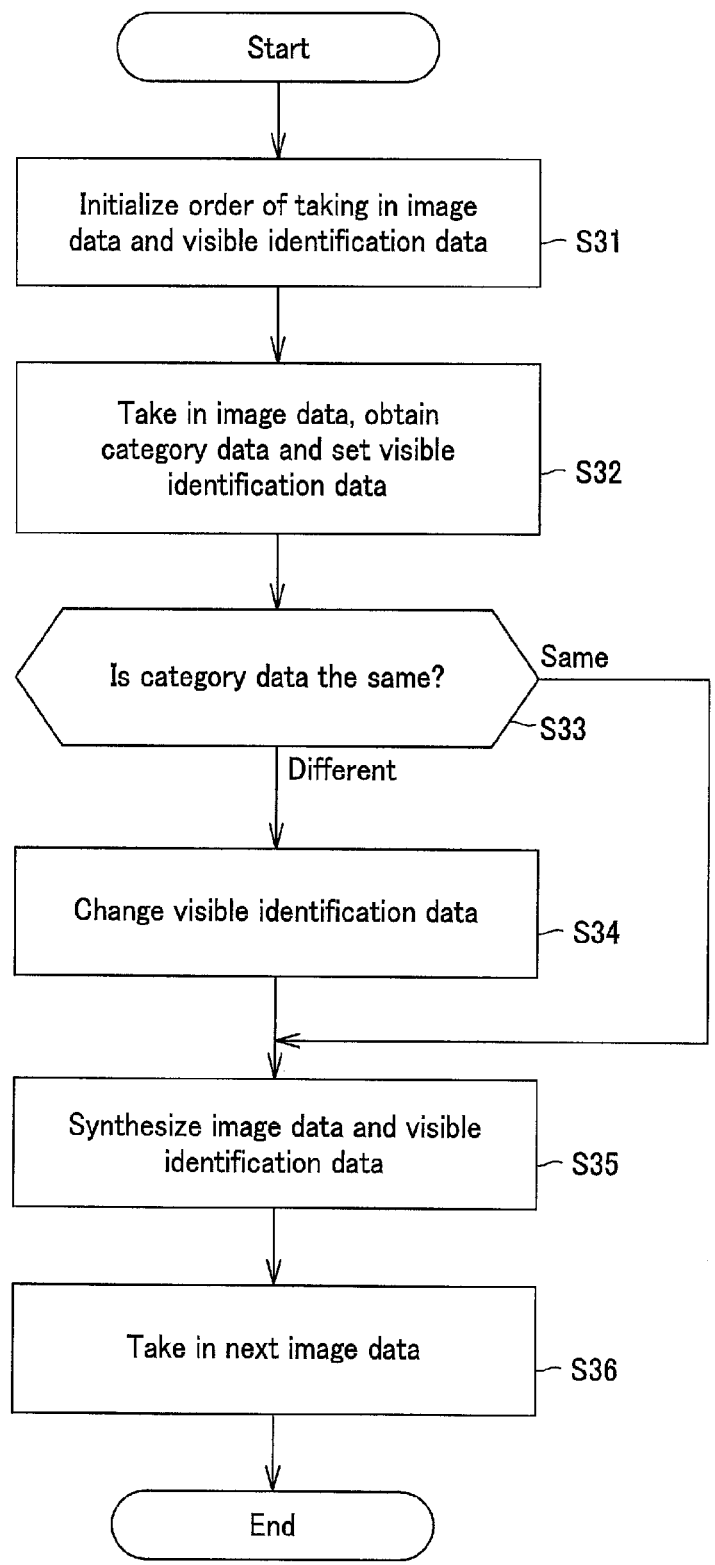
FIG. 13 is a flowchart showing operation according to the third embodiment.

Next, referring to FIG. 13, the operation of the video printer 1 mentioned above will be described. In step S31, the image processing section 13 initializes a sequence of taking in the data 5 to be taken in from the image memory 12. At the same time, the control section 18 performs initialization processing of the visible identification data 23 to synthesize the image data 5 to be taken in. In step S32, the image data 5 is inputted from the endoscope device 2 through the video signal line 21 to the image processing section 13 and stores the image data on the image memory 12. At the same time, the control section 18 obtains category data from the endoscope device 2 through the control signal line 22 and set the first visible identification data 23. The control section 18 determines whether the obtained category data in step S33 is the same as the category data previously obtained or not. If different, the control section 18 proceeds to step S34, and, if same, goes to step S35. If the category data is the same, the same kind of the visible identification data 23 as the visible identification data 23 thus far set is outputted to the image processing section 13.

When the category data is different, in step S34, the control section 18 performs change processing of the visible identification data 23 and outputs the visible identification data 23 to the image processing section 13. For example, when the visible identification data 23 is set at "O", if the category data changes, the visible identification data 23 is changed from "O" to "Δ".

In step S35, the image processing section 13 synthesizes the visible identification data 23 inputted from the control section 18 and the image date 5 read out from the image memory data 12 corresponding to this visible identification data 23. In step S36, the image processing section 13 takes in the next image data 5 from the image memory 12. At the same time, the control section 18 obtains the category data of the image data 5 to be taken in from the endoscope device 2 through the control signal line 22 and repeats the processing from step S32.

In this manner, upon synthesizing the visible identification data 23 inputted from the control section 18 on the image data 5 inputted from the image memory 12, the image processing section 13 synthesizes the data 5 on the four regions A to D in order of control by the image memory 12. The synthetic image data 8 shown in FIG. 4 is generated. Next, the image processing section 13 outputs this synthetic image data 8 to the output terminal 14 and displays this synthetic image data 8 on the screen of the video monitor 3.

Further, the image processing section 13 determines which of the regions A to D of the synthetic image data 8 was selected from the operating section 17 based on the selection signals from the control section 18. With regard to the selected region, the image processing section 13 performs trimming processing to remove the additional information section 7 from the image data 5 allocated to the selected region. At the same time, the image processing section 13 performs enlargement processing to enlarge the captured image section 6 inside the regions A to D. Further, with regard to the not-selected region, the image processing section 13 performs no image processing with respect to the image data 5 assigned to the not-selected region.

The image processing section 13 synthesizes the image data, which was subjected to trimming the selected region, and the image data of the not-selected region and generates the synthetic image data 9 shown in FIG. 12. Namely, on the region subjected to selection processing, together with the visible identification data 23, the captured image section 6 is synthesized. On the region not selected, the image data 5 including the captured image section 6 and the additional information 7 is synthesized. Then, the image processing section 13 outputs the synthetic image data 9 thus generated and shown in FIG. 12 from the output terminal 14 to be displayed on the video monitor 3. Further, when the print execution operation is performed, the image processing section 13 outputs the synthetic image data 9 shown in FIG. 12 to the print signal conversion section 16 to be converted to print data by the print signal conversion section 16. By driving the print head 15, the synthetic data 9 displayed on the video monitor 3 is printed on the recording paper 4.

According to the example mentioned above, without looking at the patient identification section 7a, each image data of the regions A to D can be specified to its kind through the visible identification data 23. Even if all the regions A to D are enlarged by the captured image section 6 and the patient identification section 7a is not displayed, by means of the visible identification data 23, specifying that the patient is different can be done. Further, even if the image data 5 of the same visible identification data 23 should spread over a plurality of the recording papers 4, by means of the visible identification data 23, the kind of the captured image section 6 or the patient can be specified.

Next, a fourth embodiment of the present invention will be described. This example is a combination of the example of the second embodiment and the example of the third embodiment mentioned above. The first image data after a change of the category data includes the captured image section 6 and the additional information section 7 and the remainder is displayed by enlarging the captured image section 6.

Figure 14:
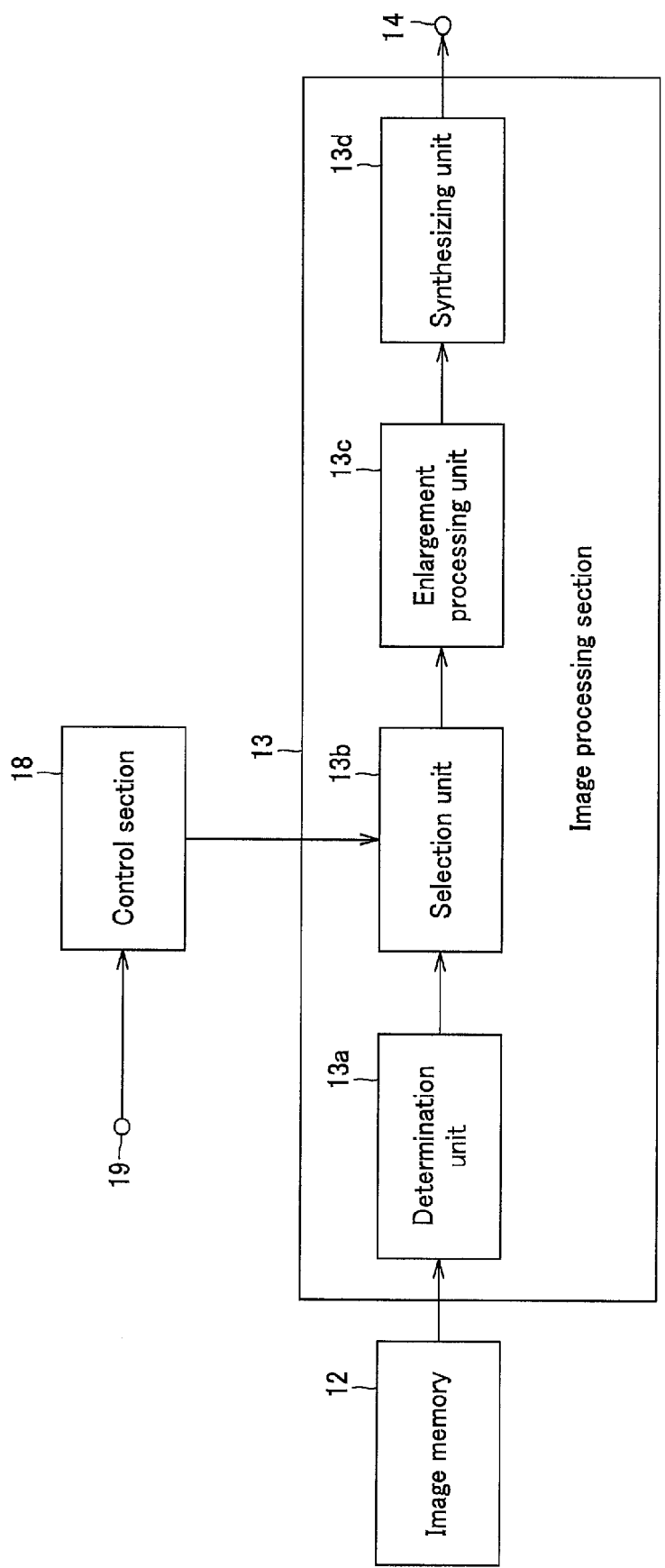
FIG. 14 is a diagram showing a configuration according to a fourth embodiment.
Figure 15:
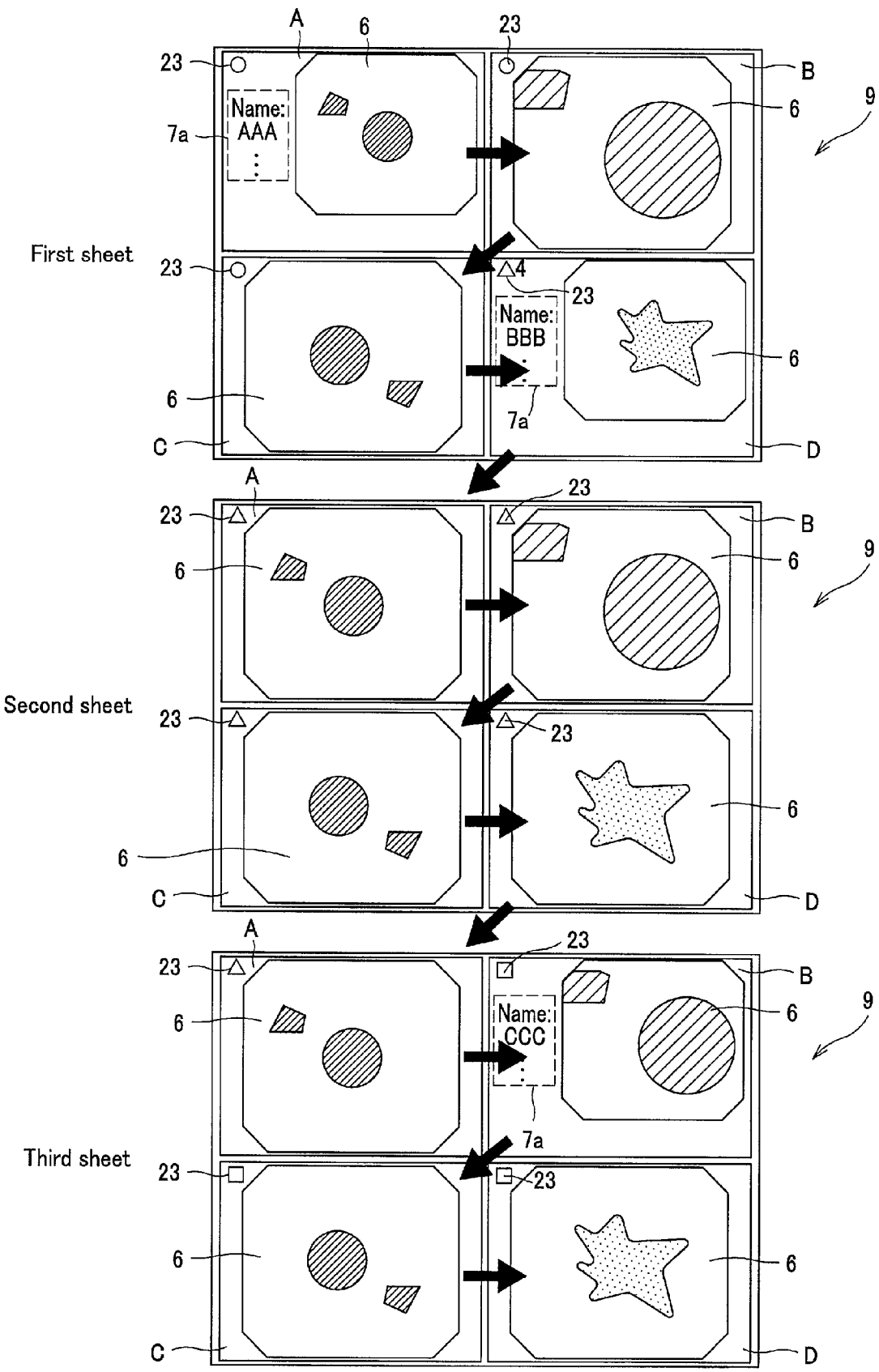
FIG. 15 is a diagram showing synthetic image data according to the fourth embodiment.

Namely, as shown in FIG. 14, as described in the third embodiment, from the endoscope device 2 through the input terminal 19, there is inputted to the control section 18 the patient identification data constituting the patient identification section 7a of the above-mentioned additional information section 7 as the category data classifying various patients. This patient identification data is made to correspond to the image data 5 of FIG. 2. Whenever the image data 5 of FIG. 2 is inputted, this patient identification data is inputted to the control section 18. The control section 18, as shown in FIG. 15, determines the inputted category data, makes the inputted category data correspond to the patient identification data, and generates the visible identification data 23. Namely, the control section 18 determines whether the category data is the same as the previously inputted category data or not. If same, the visible identification data 23 same as the previous visible identification data 23 is selected. If different, the visible identification data 23 different from the previous visible identification data 23 is selected.

Further, as described in the above-mentioned second embodiment, the image processing section 13 includes the determination section 13a that determines the image data 5 to be respectively assigned to the regions A to D, the selection section 13b that selects the image data 5 enlarging the captured image section 6, the enlargement processing section 13c that performs trimming and enlargement processing of the image data 5 selected by the selection section 13b, and the synthesis section 13d that synthesizes the image data to be processed for enlargement and the image data as it is.

At this point, the determination section 13a, as mentioned above, provides the identification numbers to the image data 5 controlled in order by the image memory 12. Further, the determination section 13a has a definition making the numbers "1" to "4" of the image data 5 correspond to the regions A to D. The determination section 13a assigns the numbered image data 5 to the regions A through D.

Then, the selection section 13b, upon detecting that the control section 18 has changed the category data, puts the first image data 5 after the category data change as not selected and selects the remaining image data 5. The enlargement processing section 13c performs trimming the above-mentioned additional information section 7 regarding the image data 5 selected by the selection section 13b, and the captured image section 6 is subjected to enlargement processing. Further, the synthesis section 13d synthesizes the selected image data 5 subjected to enlargement processing and the not-selected image data not subjected to enlargement processing on various designated regions and generates the synthetic image data 9 shown in FIG. 15.

In the example of FIG. 15, the control section 18 assigns "O" to the first patient AAA as the visible identification data 23, assigns "Δ" to the second patient BBB, and assigns "☐" to the third patient CCC.

Further, the region A and the region D are not selected on the first sheet while the regions B and C are selected there. The regions B and C are the regions where the captured image section 6 of the patient AAA is enlarged. On the region A not selected, there is provided the patient identification section 7a showing the patient AAA as the additional information section 7. On the region D not selected, there is provided the patient identification section 7a showing the patient BBB as the additional information section 7.

Furthermore, the regions A to D are all selected on the second sheet with the captured image section 6 of the patient BBB enlarged. Note that on the second sheet, the patient identification section 7a is not shown but the patient can be specified in the visible identification data. Moreover, note that on the third sheet, the region A, the regions C and D are selected with the captured image section 6 enlarged. The region B is not selected there and the patient identification section 7a showing the patient CCC is provided as the additional information section 7.

Namely, the region A to the region C of the first sheet are assigned to the patient AAA whose visible identification data 23 is "O". The patient identification section 7a is provided to the leading region A which is not selected. Further, the region D of the first sheet to the region A of the third sheet are assigned to the patient BBB whose visible identification data 23 is "Δ". To the leading region D of the first sheet not selected, there is provided the patient identification section 7a. Furthermore, the region B to the region D of the third sheet are assigned to the patient CCC whose visible identification data 23 is "☐". To the leading region B not selected, there is provided the patient identification section 7a. Note that the region of each patient not selected may be the second or the third region of each patient.

Figure 16:
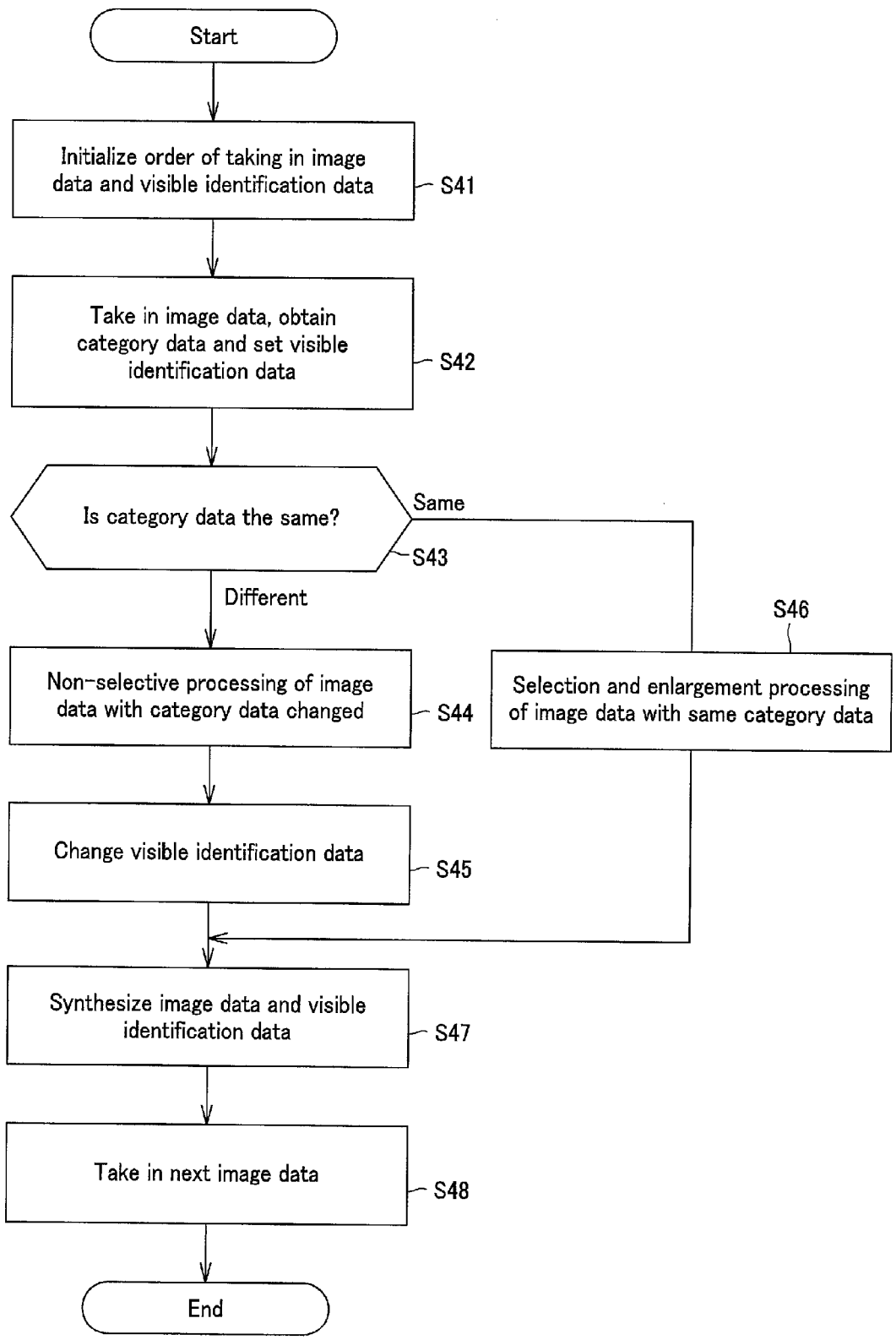
FIG. 16 is a flowchart showing operation according to the fourth embodiment.

Next, the operation of the video printer 1 as mentioned above will be described referring to FIG. 16. First, in step S41, the determination section 13a performs initialization of the sequence of taking in the image data 5 to be taken in from the image memory 12. At the same time, the control section 18 performs initialization processing of the visible identification data 23 to be synthesized in the image data 5 to be taken in. Then, in step S42, the determination section 13a performs numbering processing of the inputted image data 5 when the image data 5 is inputted from the endoscope device 2 through the video signal line 21. At the same time, the determination section 13a stores the image data in the image memory 12. Further, the control section 18 obtains the category data of the image data 5 to be taken in from the endoscope device 2 through the control signal line 22 and sets the first visible identification data 23.

Next, in step S43, the control section 18 determines the obtained category data to see whether the obtained category data is the same as the previously obtained category data. If different, the control section 18 proceeds to step S44, and if same, proceeds to step S46.

When the category data is different, in step S44, the selection section 13b sets the image data 5 corresponding to the first category data different from the previous category data as not selected. In step S45, the control section 18 performs change processing of the visible identification data 23. For example, when the visible identification data 23 is set as "O" and if the category data changes, the control section 18 changes the visible identification data 23 from "O" to "Δ".

In step S43, when the category data is the same as the previous category data, the selection section 13b selects the image data 5 corresponding to the category data in step S46, so that the captured image section 6 can be subjected to enlargement processing.

In step S47, the selection section 13b synthesizes the visible identification data 23 inputted from the control section 18 and the image data 5 corresponding to this visible identification data 23. In step S36, the image processing section 13 takes in next image data 5 from the image memory 12. At the same time, the control section 18 obtains the category data of the image data 5 to be taken in from the endoscope device 2 through the control signal line 22 and repeats the processing from step S41.

Thereafter, the enlargement processing section 13c subjects the additional information section 7 to trimming regarding the image data 5 selected in step S46, performs enlargement processing to enlarge the captured image section 6, and outputs the data subjected to enlargement processing to the synthesis section 13d. Then, in the synthesis section 13d, each image data is synthesized on the region A to the region D made to correspond to the numbers numbered in step S41 and the synthetic image data 9 of each page in FIG. 15 is generated. The synthesis section 13d, by outputting the generated image data 9 shown in FIG. 15 through the output terminal 14, displays the image data 9 on the video monitor 3 or outputs the image data 9 to the print signal conversion section 16 for printing.

According to the example mentioned above, when the category data is changed, the additional information section 7 is automatically displayed together with the captured image section 6, and hence, an operation to select a region for the user to enlarge and display can be omitted, thus contributing to improving convenience. Further, by displaying the captured image section 6 of one patient on one sheet of recording paper 4, for example, by assigning four sheets of the image data 5 to one patient in this case, photo prints can be easily controlled.

As discussed above, an example of using the endoscope device 2 for the external device on the input side was explained. As for the external device on the input side, an ultrasonic image-pickup device, an MRI, or an electron microscope is acceptable. Further, to the video printer 1, a different kind of medical video device may be connected. Moreover, as an external device to be connected to the video printer 1, digital or analog video camera or video deck for consumer or industrial use may be used.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for generating synthetic image data based on an inputted image data from an external device, the apparatus comprising:
   input means for inputting image data from the external device, said image data including an image section and an additional information section;
   an image memory that saves the image data input via the input means;
   image processing means for generating synthetic image data to respectively display a plurality of image data saved in the image memory on a plurality of designated regions assigned to a screen; and
   output means for outputting the synthetic image data;
   wherein
       the image processing means determines whether the image data including the image section and the additional information section is to be displayed on a first designated region of the screen,
       the image processing means generates the synthetic image data so that an image section, which is to be displayed on a second designated region of the screen, is an enlarged version of the image section that is to be displayed on the first designated region, and
       the synthetic image data are generated such that the additional information section occupies less display space within the second designated region than does the additional information section within the first designated region, thereby accommodating the enlarged version of the image section within the second designated region.

2. The image processing apparatus according to claim 1, wherein the image processing means omits the additional information section from being displayed on the second designated region upon enlarging a display of the image section of the second designated region.

3. The image apparatus according to claim 1, wherein the image processing means omits a part of the additional information section from being displayed on the second designated region upon enlarging a display of the image section of the second designated region.

4. The image processing apparatus according to claim 1, wherein the image processing means reduces the additional information section to be displayed on the second designated region upon enlarging a display of the image section of the second designated region.

5. The image processing apparatus according to claim 1, wherein:
   (a) the image processing means comprises
       determination means for determining on which region of the plurality of designated regions the image data is to be displayed, and
       selection means for selecting the image data determined by the determination means to be allocated to the second designated region; and
   (b) the image processing means enlarges the image section regarding the image data selected by the selection means.

6. The image processing apparatus according to claim 1, wherein the image processing means further comprises (a) obtaining means for obtaining category data of the image data to be inputted into the input means;

(b) determination means for determining the category data obtained by the obtaining means; and (c) setting means for setting visible identification data corresponding to the category data determined by the determination means, and wherein the image processing means synthesizes the visible identification data set by the setting means with respect to the image data allocated to each of the designated regions, so as to display the synthesized data on the respective designated regions.

7. The image processing apparatus according to claim 6, wherein the image processing means allocates to the first region the image data when the category data changes so that the image data including the image section and the additional information section is displayed on the first designated region.

8. The image processing apparatus according to claim 6, wherein the category data is inputted from the external device.

9. The image processing apparatus according to claim 1, further comprising print means, connected to the output means, for printing the synthetic image data.

10. The image processing apparatus according to claim 1, further comprising display means, connected to the output means, for displaying the synthetic image data.

11. The image processing apparatus according to claim 1, wherein the external device is an endoscope device.

12. An image processing method for generating synthetic image data based on image data input via an external device, the method comprising:

receiving image data including an image section and an additional information section associated therewith input from the external device;

saving the image data in an image memory; and generating synthetic image data to respectively display a plurality of image data saved in the image memory on a plurality of designated regions assigned to a screen;

wherein upon generating the synthetic image data, the image data including the image section and the additional information section are displayed on a first designated region of the screen, and the synthetic image data are generated so that an image section, which is to be displayed on a second designated region of the screen, is an enlarged version of the image section that is to be displayed on the first designated region, and the synthetic image data are generated such that the additional information section occupies less display space within the second designated region than does the additional information section within the first designated region, thereby accommodating the enlarged version of the image section within the second designated region.

13. The image processing method according to claim 12, wherein upon generating the synthetic image data, regarding the image data whose image section is enlarged and displayed on the second designated region, the image section is enlarged by omitting the additional information section from being displayed within the second designated region.

14. The image processing method according to claim 12, wherein upon generating the synthetic image data, regarding the image data whose image section is enlarged and displayed on the second designated region, the image section is enlarged by omitting a part of the additional information section associated with the second designated region.

15. The image processing method according to claim 12, wherein upon generating the synthetic image data, regarding the image data in which the image section is enlarged and displayed on the second designated region, the image section is enlarged by reducing the additional information section.

16. The image processing method according to claim 12, wherein upon generating the synthetic image data comprises:

determining on which region of the plurality of designated regions the image data is to be displayed, and selecting the image data determined to be allocated to the second designated region, wherein the image section of the selected image data is enlarged.

17. The image processing method according to claim 12, further comprising:

obtaining category data of the image data to be inputted to the input means;

determining the obtained category data;

setting visible identification data corresponding to the determined category data; and synthesizing the set visible identification data with respect to the image data to be allocated to each of the designated regions and arranging for display thereof on each of the respective designated regions.

18. The image processing method according to claim 17, further comprising assigning the image data to the first designated region when the category data changes so as to display the image data including the image section and the additional information section on the first designated region.

19. The image processing method according to claim 17, wherein the category data is obtained from the external device.

20. The image processing method according to claim 12, further comprising printing the generated synthetic image data.

21. The image processing method according to claim 12, further comprising displaying the generated synthetic image data on a monitor.

22. An image processing apparatus for generating synthetic image data based on image data input via an external device, the apparatus comprising:

an input section that receives image data, including an image section and an additional information section associated therewith, from the external device;

an image memory that saves the image data received by the input section;

an image processing section that generates synthetic image data to respectively display a plurality of image data saved in the image memory on a plurality of designated regions assigned to a screen; and an output section that outputs the synthetic image data, wherein the image processing section is arranged to:

display the image data including the image section and the additional information section on a first designated region of the screen, generate synthetic image data so that an image section, which is to be displayed on a second designated region of the screen, is an enlarged version of the image section that is to be displayed on the first designated region, and reduce the additional information section to be displayed on the second designated region upon enlarging a display of the image section of the second designated region.

23. The image processing apparatus of claim 1, wherein the additional information includes patient identification data and status identification data,
   said patient identification data includes a patient ID, and
   said status identification data includes status data of the external device.

24. The image processing apparatus of claim 6, wherein the determination means arranges the category data to correspond to the additional information and generates the appropriate visible identification data based on the category data.

* * * * *